United States Patent [19]

Goodman, Jr. et al.

[11] Patent Number: 4,664,248
[45] Date of Patent: May 12, 1987

[54] DEVICE AND METHOD FOR CONVEYING AND ORIENTING RANDOMIZED CIRCULAR PRODUCT-CARRYING PUCKS

[75] Inventors: William H. Goodman, Jr., Cincinnati, Ohio; Alson R. Harm, Sunman, Ind.; Ronald W. Kock, Wyoming; Howard N. Reiboldt, College Corner, both of Ohio

[73] Assignee: The Procter & Gamble Company, Cincinnati, Ohio

[21] Appl. No.: 838,898

[22] Filed: Mar. 11, 1986

Related U.S. Application Data

[63] Continuation of Ser. No. 415,667, Sep. 7, 1982, abandoned.

[51] Int. Cl.⁴ .............................................. B65G 47/24
[52] U.S. Cl. ...................... 198/394; 198/383; 198/453; 198/633; 198/699.1; 198/803.8
[58] Field of Search ............... 198/394, 453, 465.1, 198/473.1, 633, 690.2, 699.1, 803.8, 382, 383, 393

[56] References Cited

U.S. PATENT DOCUMENTS

| | | | |
|---|---|---|---|
| 2,707,547 | 5/1955 | Gewecke | 198/33 |
| 3,052,340 | 9/1962 | Lyons et al. | 198/648 X |
| 3,109,530 | 11/1963 | McPherson | 198/394 X |
| 3,297,134 | 1/1967 | Pastuszak | 198/33 |
| 3,576,247 | 4/1971 | Caulford | 198/33 |
| 3,797,889 | 3/1974 | Wilkinson | 302/2 |
| 3,920,129 | 11/1975 | Le Vasseur | 198/472 |
| 3,998,319 | 12/1976 | Mernoe | 198/453 X |

FOREIGN PATENT DOCUMENTS

| | | | |
|---|---|---|---|
| 2505333 | 8/1975 | Fed. Rep. of Germany | 198/453 |
| 2126185 | 3/1984 | United Kingdom | 198/394 |

Primary Examiner—Joseph E. Valenza
Assistant Examiner—Lyle Kimms
Attorney, Agent, or Firm—Frost & Jacobs

[57] ABSTRACT

Device and a method are taught for specifically orienting and conveying products in a common direction of travel. The products are individually mounted on a plurality of identical, circular, product-carrying pucks. Each circular puck has a flat conveyor-contacting bottom surface and at least one circular peripheral surface contactable by corresponding circular peripheral surfaces of other pucks when located in a random surge thereof. Each puck is surmounted by a product support. Between its bottom surface and its product support, each puck has a peripheral slide surface parallel to the desired direction of travel of the oriented puck and at least one peripheral rotation-producing surface, the slide and rotation-producing surfaces being inset from the circular peripheral surface. A conveyor is provided having in association therewith at least one external contact surface to engage the rotation-producing surface of each puck and an alignment rail having an alignment edge to contact the slide surface of each puck. Each puck is conveyed past the at least one contact surface which cooperates with the at least one rotation-producing surface to cause rotation of the puck until the alignment edge of the alignment rail contacts the puck slide surface to stop rotation of the puck in the desired orientation and to maintain this orientation of the puck as it is conveyed to the next work station.

18 Claims, 15 Drawing Figures

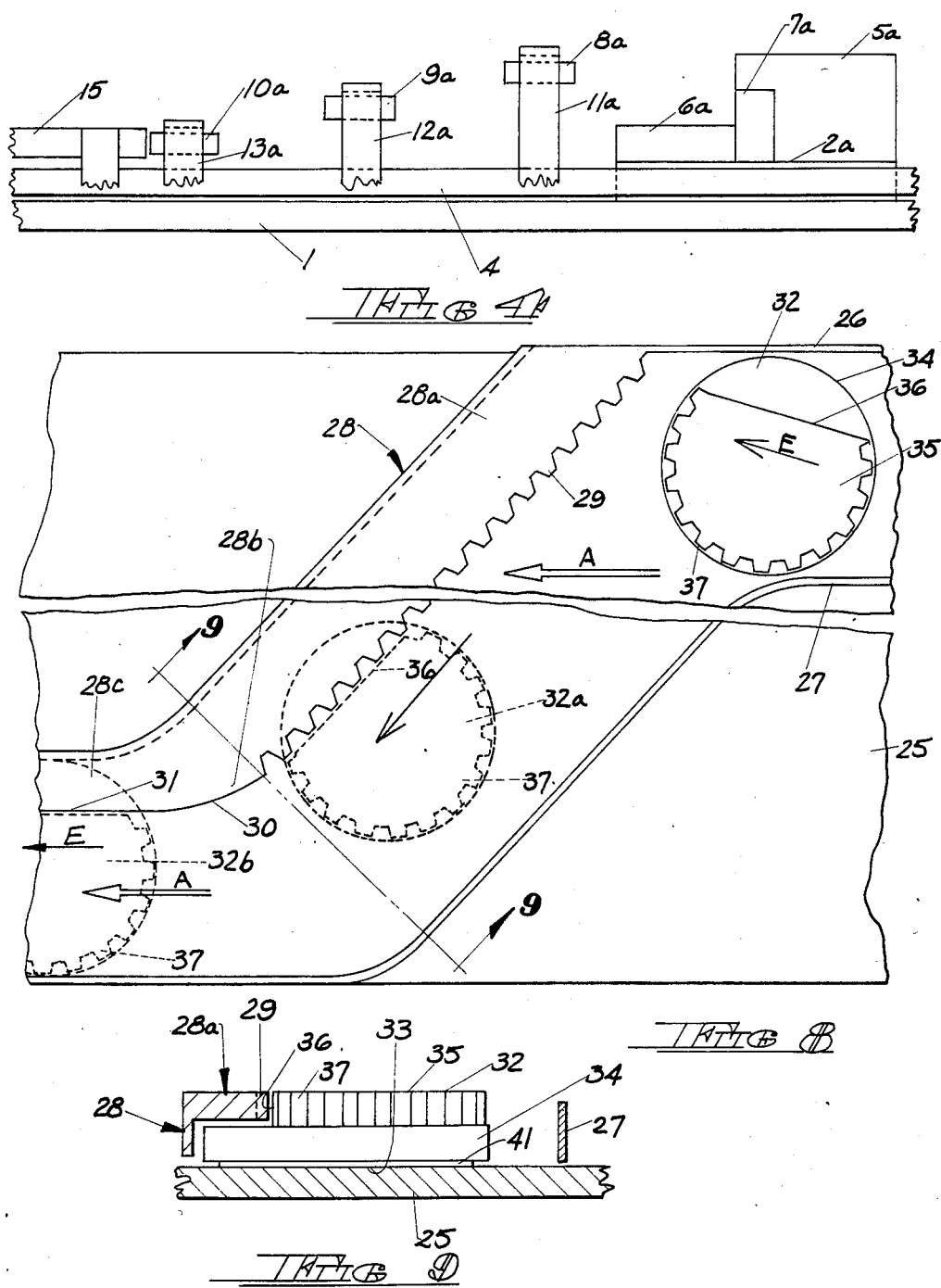

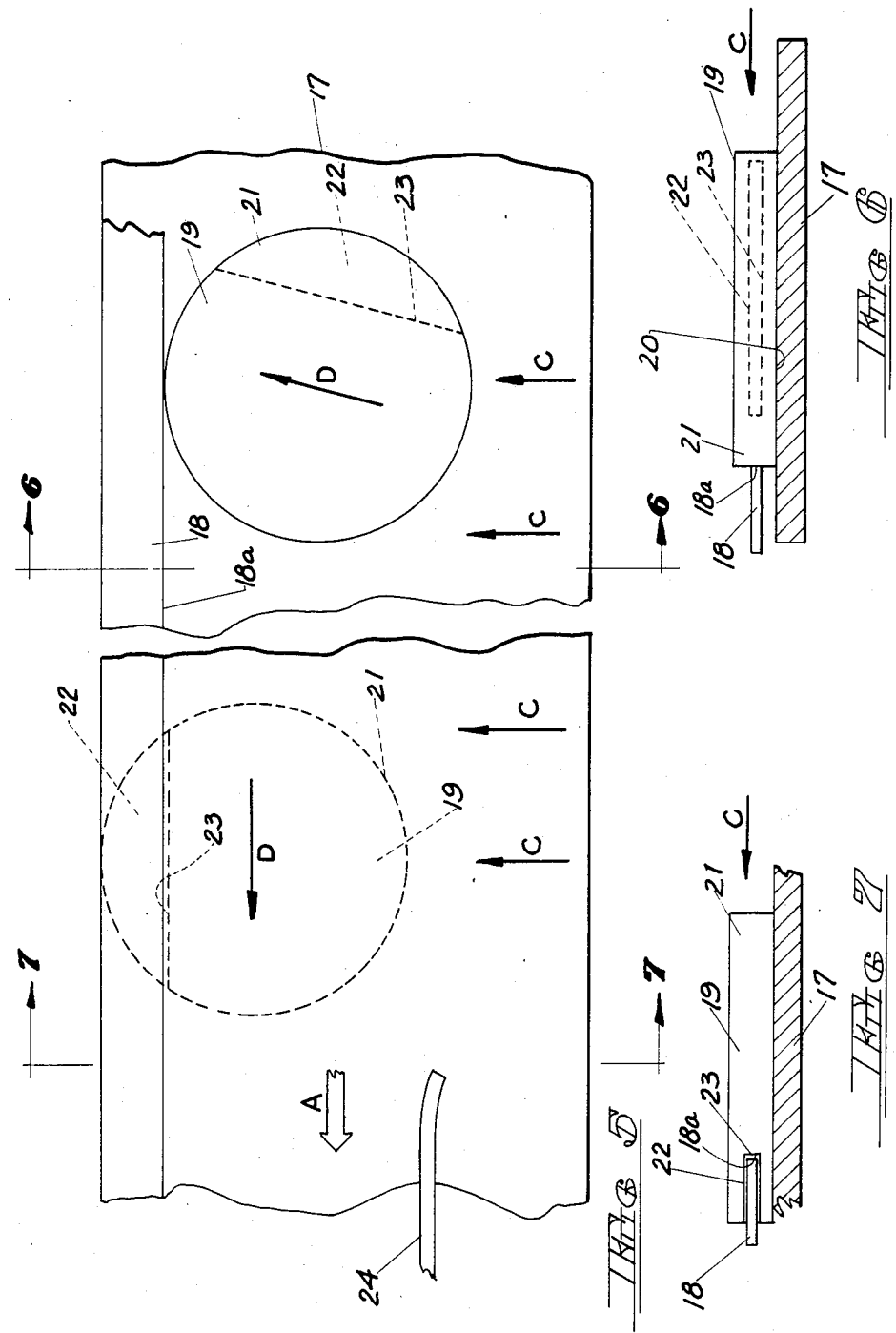

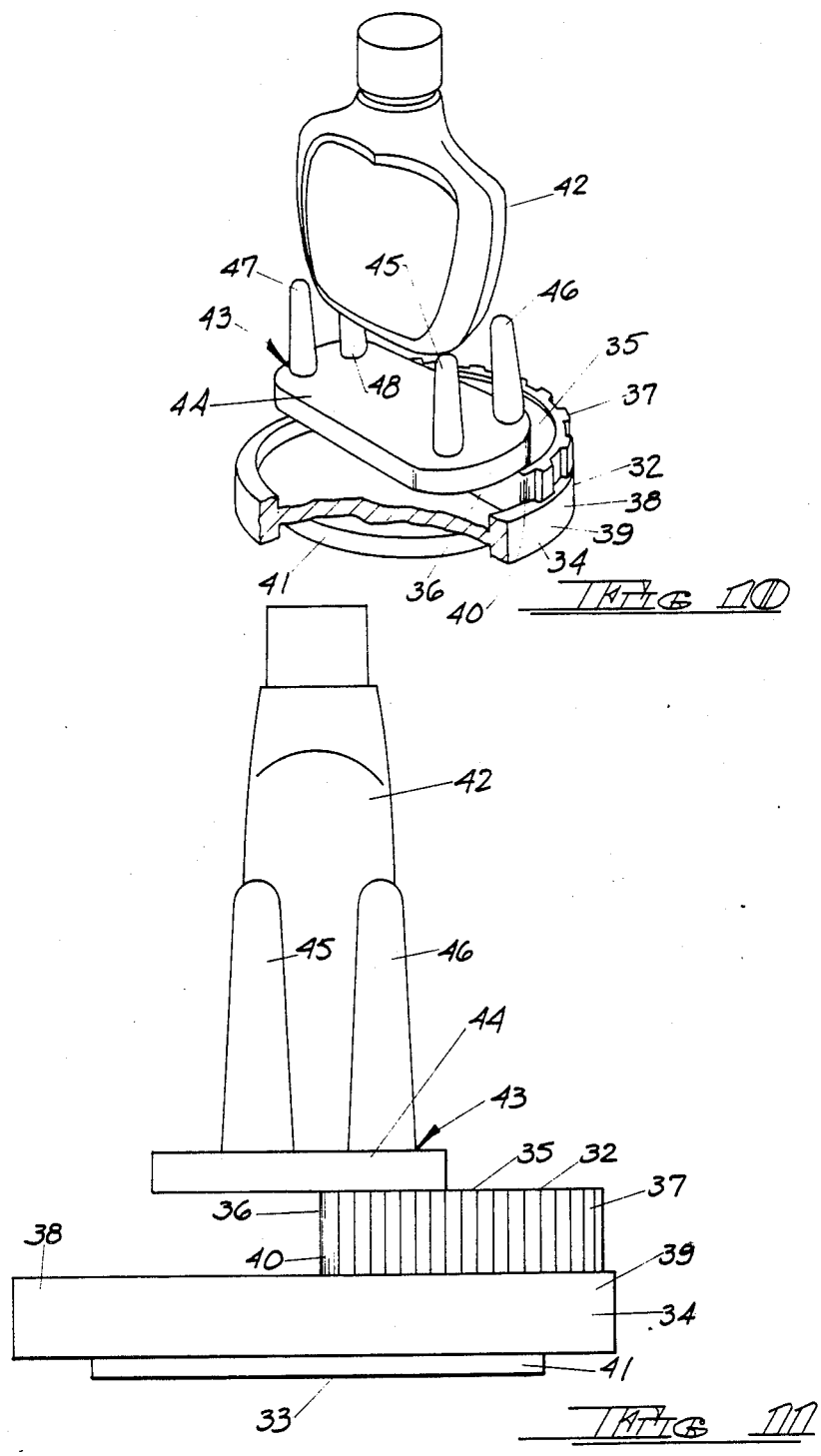

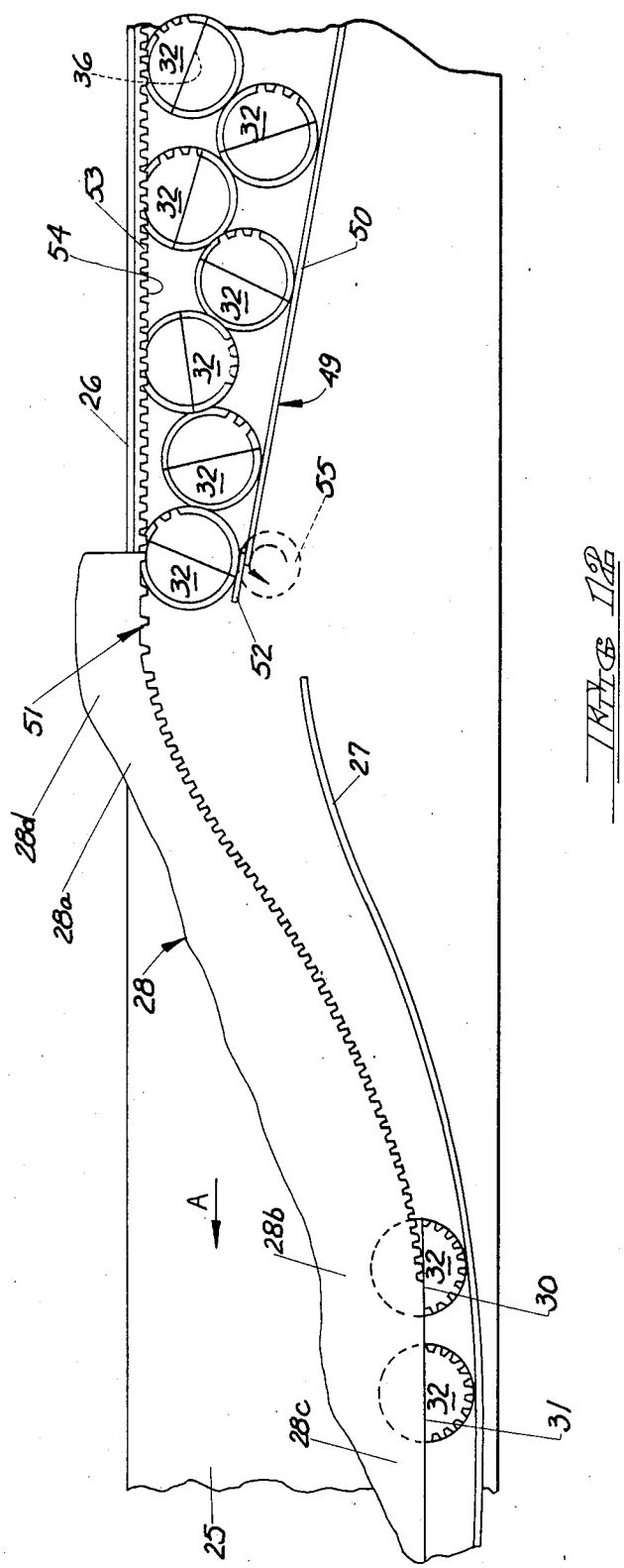

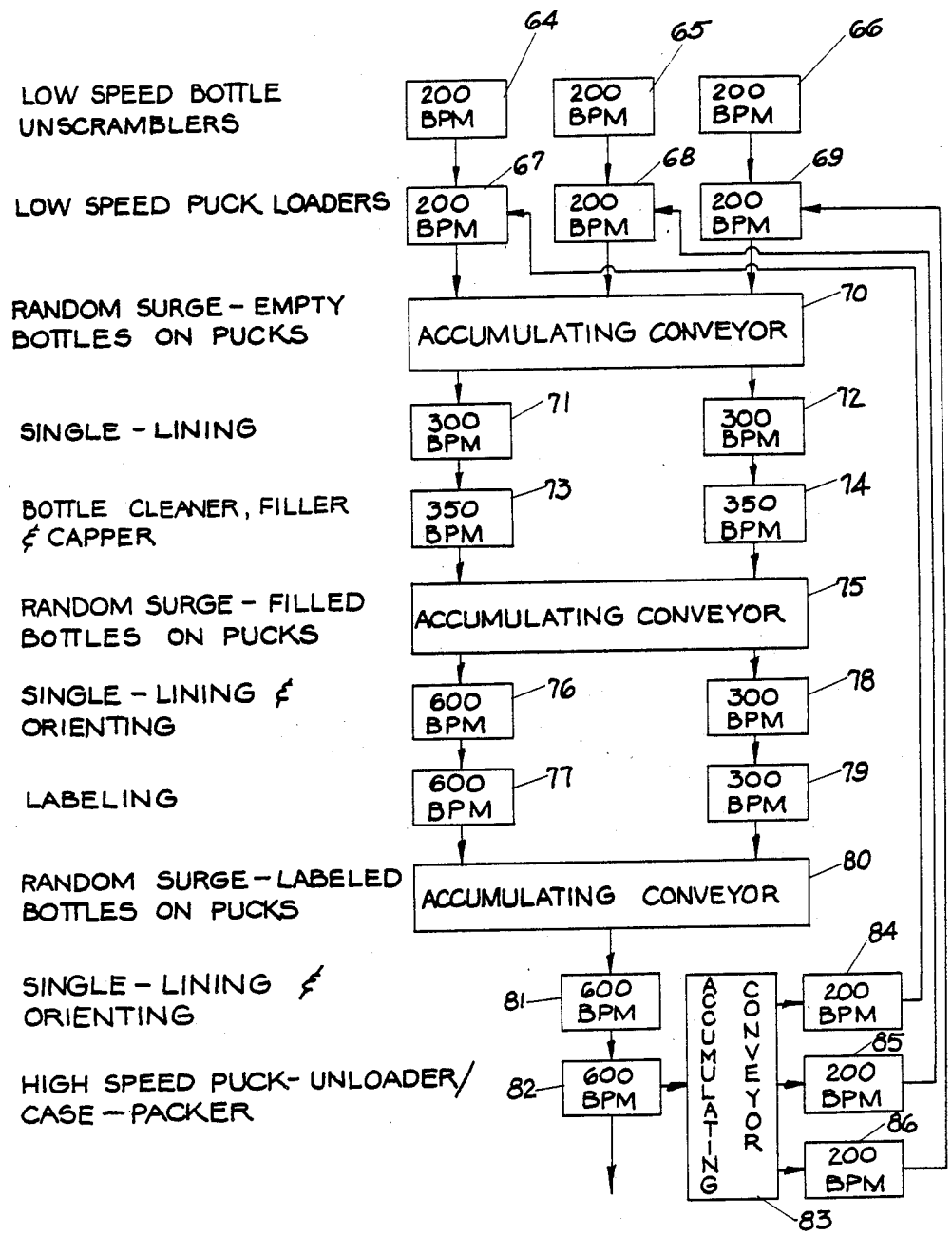

DEVICE AND METHOD FOR CONVEYING AND ORIENTING RANDOMIZED CIRCULAR PRODUCT-CARRYING PUCKS

This is a continuation of application Ser. No. 415,667 filed Sept. 7, 1982, now abandoned.

TECHNICAL FIELD

The invention relates to means and method for conveying and orienting products, and more particularly to such means and method for specifically orienting and conveying in a common direction of travel a plurality of identical, circular, product-carrying pucks from an accummulated source thereof having random orientation.

BACKGROUND ART

Prior art workers have devised numerous types of product orienting devices and methods. U.S. Pat. Nos. 2,707,547; 3,109,530; 3,297,134 and 3,576,249 are exemplary only of such devices and methods. In each of these instances, however, orientation is achieved by means of a specific feature of the product being oriented, with pins provided on the product, a flat formed on the product, or a peripheral seam of the product.

The use of pallets or pucks of various shapes for conveying discrete products has been in practice for some time. The use of such pucks increases product design flexibility, since the product design need not be limited by good conveying characteristics. The use of pucks enables the conveying of products which are odd shaped (i.e. non-cylindrical, assymmetrical, provided with a handle, etc), fragile, or which lack stability (i.e. are subject to toppling). The use of pucks in conjunction with such products eliminates shingling (vertical or horizontal overlapping of products), squirting (vertical displacement due to product-to-product contact), denting, breakage and jams during the conveying procedure. The use of pucks also permits wider flexibility of product material or strength. This is because the pucks prevent product-to-product contact, and thereby limit damage due to impact, scuffing, and line pressure.

Quicker size changeovers are possible when machines and conveyors are set to a common size puck upon which several different size products can be carried. Another advantage of adapting machines to the use of pucks is that product dimensional tolerances can be relaxed without reducing the product's ability to go through a processing line without additional problems due to shape or dimensional variations from product-to-product.

In prior art product processing lines of the type wherein one or more of the operations require specific orientation of the product, it is common practice to obtain the desired product orientation early in the line and to maintain it throughout the line, even through those operations which do not require a specific orientation. Where pucks are used in such a line, it is the usual practice to employ non-round pucks to assist in maintaining a specific orientation. When on-line orientation of products is not needed (such as may be the case for symmetrical products that are predecorated) and when pucks are used for other reasons, such as protection for a fragile product or for purposes of product stability, it is preferable to use round pucks. Round pucks having circumferential surfaces with low coefficients of friction offer the free flowing characteristics of stable, round products (such as beverage cans or the like).

Prior art workers, dealing with round, stable products not requiring orientation have devised network style lines. Network style lines are those which have more than one machine in parallel per operation, wherein the products can flow from a random surge or accummulating conveyor through any of the parallel machines. The products flow from a random accummulation thereof through any of the machines or stations which are operating, and at the rate demanded by that particular machine or station. Random product surging or accumulation not only provides means for feeding products to several machines or stations from the same source, but also provides the capabilty for large, space efficient, accummulation of products between operations to keep the system running when individual machines or stations are down.

Machines in a network style line are independent of the speed of machines in other operations and are independent of the speed of other machines in the same operation. Thus, each machine can run at its optimum speed for highest efficiency. In operations which tend to be of lower efficiency, or which require considerable down time for maintenance, redundant or spare machines can be operated in parallel to maintain the desired thruput. Furthermore, size changes can be made in some machines while others are still running product, in order to minimize line downtime. Capital investment is optimized in network style lines because the number of machines needed for any operation is a function of the machine speed divided into the desired line thruput. For serial lines, one machine is needed for each operation, regardless of its speed potential. The serial line thruput is a function of the slowest machine or station in the line. The network line system permits alternative machine speed control strategies because parallel paths enable bypassing of bottlenecks in the line.

Round pucks can, of course, be used in a network style line to provide roundness, stability and protection for non-round products. However, networking, by its very definition, loses specific orientation (that is, rotational position about a vertical axis or an axis perpendicular to the conveyor surface) and therefore has not hitherto been deemed suitable for lines wherein one or more of the operations requires specific orientation of the product.

The practice of the present invention provides simple, reliable, round puck orientation wherever it is needed for a particular machine or operation in a line. Product orientation need no longer be achieved early in the line and then maintained throughout the line.

The puck orienting means and method allow products to have orientation controlled in either of two positions. This provides flexibility in line layout. For example, a label can be applied to one side of a product and then the puck and product can be rotated 180° for a label to be applied to the other side, all from the same side of the line. The practice of the present invention also permits handled bottles or the like to be turned to the desired orientation for case packing. This assumes that all handles were oriented in the proper direction when the bottles were placed on the pucks, which were also commonly oriented The practice of the present invention enables the use of round pucks in a network style line even when certain operations or machines of the line require specific product orientation. Through the practice of the present invention, the products can be specifically oriented; the orientation can be lost on the network system accummulating conveyors; and the desired orientation can be regained at those unit operations requiring it. All of this can result in higher machine speeds and higher conveying speeds and/or lower investment cost and thus greater productivity.

DISCLOSURE OF THE INVENTION

According to the invention there is provided both means and method for specifically orienting and conveying products in a common direction of travel. The products are individually mounted on a plurality of identical, circular, product-carrying pucks. Each circular puck is characterized by a bottom surface adapted to rest stably upon a conveyor and at least one circular peripheral surface contactable by corresponding circular peripheral surfaces of other identical pucks, when located in an accummulation area such as on an accummulating conveyor. Each puck is surmounted by a product support, enabling a product to be mounted on the puck.

Between its bottom surface and its product support the puck has a peripheral slide surface which is parallel to the desired direction of travel of the oriented puck and at least one peripheral rotation-producing surface. Both the slide surface and the at least one peripheral rotation-producing surface are inset from the circular peripheral surface.

A conveyor is provided. The product carrying pucks, randomly oriented, are fed to the conveyor and single-lined by conventional means so as to follow one after the other. In association with the conveyor there is at least one external contact surface configured to engage the rotation-producing surface of the puck and to cause rotation of the puck. There is also provided, in association with the conveyor, an alignment rail having an alignment surface adapted to contact the slide surface of the puck.

Each puck is conveyed by the conveyor past the at least one external contact surface. This contact surface cooperates with the at least one rotation-producing surface on the puck to cause rotation of the puck. Rotation of the puck continues until the slide surface of the puck is properly oriented and engages the alignment surface of the external alignment rail. This stops further rotation of the puck.

Once the puck has been properly oriented, orientation is maintained by capturing the puck between the above mentioned alignment rail and a guide rail of conventional design which makes contact with the outside surface of the puck on that side of the puck opposite its slide surface.

In one embodiment of the invention, the puck is provided with three radial teeth, two of which are aligned to extend across the diameter of the puck, and the third of which is oriented at 90° to the first two. The side of the two aligned teeth, opposite that side from which the third tooth extends, constitutes the slide surface of the puck. The conveyor is provided with three external contact surfaces to one side thereof and equally spaced from each other. These contact surfaces may take the form of pins or rollers. The conveyor is also provided with an alignment rail having an alignment surface adapted to contact the slide surface of the puck. The alignment surface of the alignment rail extends inwardly of the edge of the conveyor and is parallel to the direction of the conveyor and to the desired orientation of the slide surface of the puck.

A second embodiment of the invention is substantially identical to the first embodiment with the exception that the teeth on the puck are of different heights, as are the contact pins or rollers in association with the conveyor.

In yet another embodiment, a conveyor is provided with an alignment rail along one side thereof. Each puck has a horizontal slot formed in its side, the base of the slot constituting a cord of the circular puck. As the puck is moved by the conveyor, it is blown against the alignment rail by air jets on the opposite side of the conveyor from the alignment rail. As the puck proceeds, it rolls along the alignment rail until the alignment rail enters the puck slot. The base of the puck slot constitutes the slide surface of the puck and contacts between the alignment rail and the base of the puck slot stops rotation of the puck and maintains the puck in the desired orientation.

In yet another and preferred embodiment of the present invention the puck is provided with a slide surface constituting essentially a cord or a diameter of the puck. The remainder of the circular periphery surface extending from one end of the slide surface to the other being provided with a plurality of teeth similar to pinion teeth. The conveyor is provided with a fixed guide rail extending partway across the conveyor at an angle between 0° and about 88°, but typically about 30°, to the direction of travel of the conveyor. The alignment rail is provided with rack-like teeth. As the puck is advanced by the conveyor, it contacts the alignment rail. The alignment rail teeth and the puck teeth mesh, resulting in rotation of the puck until its slide surface contacts the alignment rail. At this point, rotation of the puck ceases and the alignment rail, contacting the puck slide surface, assures that the puck is in the desired orientation and maintains this desired orientation. The pitch of the teeth on the alignment rail and the curvature of the alignment rail are such that the sliding surface of the puck does not stumble or catch on the teeth and begin rotating again. If the alignment rail is parallel to the direction of travel of the conveyor (i.e., at an angle of 0° thereto), some force other than the movement of the conveyor will be required to urge the puck and alignment rail teeth into engagement. The alignment rail can be replaced by a driven endless belt, as will be described hereinafter.

BRIEF DESCRIPTION OF THE DRAWINGS

FIG. 4 is a fragmentary, semi-diagrammatic, side elevational view of the embodiment of FIG. 3.

FIG. 5 is a fragmentary, semi-diagrammatic plan view of a third embodiment of the present invention.

FIG. 6 is a cross sectional view taken along section line 6—6 of FIG. 5.

FIG. 7 is a cross sectional view taken along section line 7—7 of FIG. 5.

FIG. 8 is a fragmentary, semi-diagrammatic, plan view of a fourth embodiment of the present invention.

FIG. 9 is a cross sectional view taken along section line 9—9 of FIG. 8.

FIG. 10 is a fragmentary exploded view illustrating a puck of the type used in the embodiment of FIGS. 8 and 9, and a product to be mounted on the puck.

FIG. 11 is an elevational view of the puck and product of FIG. 10.

FIG. 12 is a fragmentary plan view of the embodiment semi-diagrammatically illustrated in FIGS. 8 and 9.

FIG. 14 is a diagrammatic representation of a network style line employing the teachings of the present invention.

DETAILED DESCRIPTION OF THE INVENTION

Figure 1:
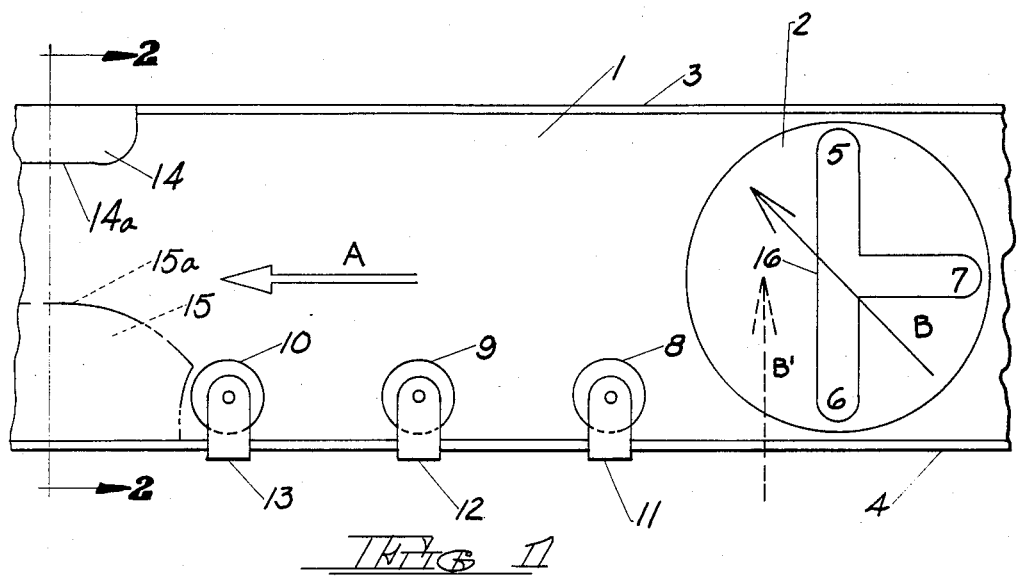
FIG. 1 is a fragmentary, semi-diagrammatic, plan view of one embodiment of the present invention.
Figure 2:
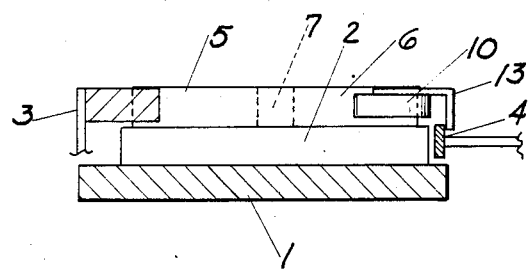
FIG. 2 is a cross sectional view taken along section line 2—2 of FIG. 1.

Reference is first made to FIG. 1 and 2 wherein a first embodiment of the present invention is illustrated. Like parts have been given like index numerals.

In FIG. 1 a conveyor is fragmentarily illustrated at 1, traveling in the direction indicated by arrow A. A circular puck 2 is shown mounted on conveyor 1 and traveling between guide rails 3 and 4. Guide rails 3 and 4 are spaced from each other by a distance slightly greater than the diameter of puck 2, so as to just nicely accommodate the puck.

It is to be understood by one skilled in the art that to the right of FIG. 1 the single line conveyor 1 is coming from a random surge such as an accumulating conveyor (not shown) and the pucks will have traveled through conventional means (not shown) to cause them to form into a single line. As the pucks enter between guide rails 3 and 4 on conveyor 1, their orientation will be random. To the left of FIG. 1 there will be a station or machine (not shown) to which conveyor 1 leads, and requiring a particular orientation of puck 2 and the product mounted thereon. For purposes of clarity, the product and its mounting means on the puck have been eliminated in FIGS. 1 and 2.

The puck 2 is provided with three upstanding radial flanges or teeth 5, 6 and 7. The teeth 5, 6 and 7 constitute the peripheral rotation-producing surfaces of the puck. The ends of the teeth are slightly inset from the puck circular periphery so as not to interfere with puck-to-puck contact in the random surge area.

Three rollers 8, 9 and 10 are mounted by means of brackets 11, 12 and 13 (respectively) to guide rail 4. Rollers 8, 9 and 10 are external contact surfaces in association with conveyor 1 and are adapted to contact puck teeth 5, 6 and 7 to cause rotation of the puck. Finally, guide rail 3 is provided with an alignment rail 14 mounted thereon and extending inwardly thereof.

The operation of the structure of FIGS. 1 and 2 can be described as follows. Arrow B indicates the desired orientation of the puck, it being understood that when the puck is properly oriented, arrow B and arrow A will be parallel and pointing in the same direction.

As conveyor 1 advances in the direction of arrow A, the tooth 6 of puck 2 will engage roller 8. This will initiate rotation of the puck in counter-clockwise direction as viewed in FIG. 1. When the puck has rotated sufficiently to enable tooth 6 to clear rollers 8, 9 and 10, the puck will have turned slightly too far. However, continued travel of the puck will cause alignment rail 14 to contact tooth 7 and the puck will rotate in a clockwise direction until both teeth 5 and 7 contact alignment rail 14. Thus, the ends of teeth 5 and 7 constitute the slide surface of the puck intended to cooperate with alignment rail 14 and its alignment surface or edge 14a. When teeth 5 and 7 contact and slide along alignment surface 14a the puck 2 and the product it carries will be properly oriented with arrow B parallel to arrow A. Further rotation of the puck is precluded by the cooperation of alignment surface 14a and guide rail 4 with respect to the puck 2.

It will be evident from FIG. 1 that puck 2, in the particular rotational position shown, requires very little rotation to bring arrow B into parallelism with arrow A. On the other hand, if the puck had been so oriented that tooth 7 pointed in the direction of arrow A upon its entry between guide rails 3 and 4, considerable rotation would be required. In such an instance, the puck would advance until roller 8 contacted tooth 5. This would initiate rotation. Continued rotation would be brought about by contact of tooth 7 by roller 9, followed by contact of tooth 6 by roller 10. This series of contacts between teeth 5, 6 and 7 and rollers 8, 9 and 10 would ultimately orient the puck so that the ends of teeth 5 and 7 would slide along alignment surface 14a with arrow B in parallelism with arrow A, and the puck and its product in proper alignment. Thus, it will be evident that the position of the puck at entry of the single line conveyor 1 will determine which teeth will make contact with rollers 8, 9 and 10. Some pucks may require little or no orienting. As an example, should the puck 2 enter single line conveyor 1 with teeth 5 and 6 extending parallel to arrow A, there will be no contact between the puck teeth and rollers 8, 9 and 10. The only contact will be between alignment surface 14a and tooth 7, resulting in a slight clockwise rotation of the puck until the ends of both teeth 5 and 7 slide along alignment rail surface 14a.

Rollers 8, 9 and 10 could constitute simple inwardly extending projections or pins. The provision of rollers, however, tends to minimize over rotation of the puck and to provide smoother operation.

The embodiment of FIG. 1 could be further modified by eliminating alignment rail 14 mounted on guide rail 3 and substituting therefor an alignment rail 15 having an alignment surface 15a and being mounted on guide rail 4. Such an alternate alignment rail is illustrated in broken lines in FIG. 1.

This positioning of the alignment rail changes the preferred orientation of puck 2 to that illustrated by broken arrow B'. Furthermore, the continuous side of teeth 5 and 6, indicated at 16, becomes the slide surface of the puck adapted to cooperate with the alignment edge 15a of alignment rail 15. This modification of the embodiment illustrated in FIGS. 1 and 2 otherwise operates in the same manner described above. This embodiment enables somewhat higher line speeds to be achieved because the slide surface 16 of the puck 2 is longer and the puck is less susceptible to over-rotation.

Figure 3:
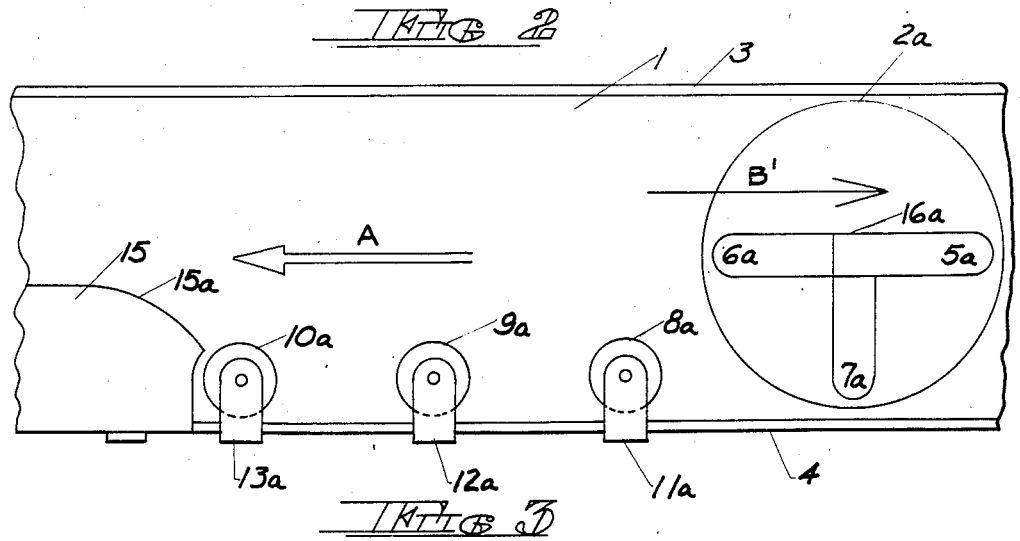
FIG. 3 is a fragmentary, semi-diagrammatic, plan view of a second embodiment of the present invention.

A second embodiment of the present invention is illustrated in FIGS. 3 and 4. Again like parts have been given like index numerals, and again the product and product carrier of the puck have been eliminated for purposes of clarity.

The embodiment of FIGS. 3 and 4 is quite similar to that of FIGS. 1 and 2 and those parts which are identical have been given like index numerals. To this end, the conveyor is shown at 1 having a direction of travel indicated by arrow A. The conveyor is flanked by guide rails 3 and 4 and an alignment rail 15, having an alignment edge 15a. Alignment rail 15 is supported on guide rail 4.

Again, three contact surfaces are provided in association with conveyor 1. While these contact surfaces may take the form of laterally extending pins or pegs, or the like, they are again illustrated as being rollers 8a, 9a and 10a. The rollers 8a, 9a and 10a are appropriately supported, as by brackets 11a, 12a and 13a (respectively), mounted on guide rail 4. The rollers 8a, 9a and 10a and their brackets 11a, 12a and 13a are identical to rollers 8, 9 and 10 and brackets 11, 12 and 13 of FIG. 1 with the exception that they are located at different vertical levels with respect to each other. Thus, while roller 10a is substantially at the same level as roller 10 of FIG. 1, roller 9a is at a higher level and roller 8a is at yet a higher level, as can most clearly be seen from FIG. 4.

The puck 2a is similar to puck 2 of FIG. 1, being provided with three radial teeth 5a, 6a and 7a. Again, teeth 5a and 6a are coextensive with tooth 7a extending from one side thereof at an angle of 90°. The continuous side of teeth 5a and 6a opposite the side from which tooth 7a extends, constitutes the slide surface 16a of the puck adapted to cooperate with the alignment surface 15a of alignment rail 15. Puck 2a differs from puck 2 of FIG. 1 only in that its three teeth extend vertically upwardly to different levels, tooth 5a being taller than tooth 7a, and tooth 7a being taller than tooth 6a, as can most clearly be seen from FIG. 4. As is evident from the last mentioned Figure, tooth 5a can be contacted by all three rollers 8a, 9a and 10a. Tooth 7a, on the other hand, can only be contacted by rollers 9a and 10a, while tooth 6a can only be contacted by roller 10a.

The operation of this embodiment is substantially similar to that described with respect to FIG. 1. Again, the number of puck teeth contacted by the rollers will depend upon the orientation of the puck as it enters conveyor 1. The desired orientation of the puck is indicated by arrow B', equivalent to arrow B' of FIG. 1. In the particular instance illustrated in FIG. 3, as the puck advances in the direction of arrow A, puck tooth 7a will pass beneath roller 8a and contact roller 9a, initiating rotation of the puck in a counter-clockwise direction as viewed in FIG. 3. Puck tooth 6a will contact roller 10a with the result that puck slide surface 16a will contact alignment rail edge 15a providing the desired orientation of the puck, with arrow B' parallel to and pointing in the same direction as arrow A. The puck will be maintained in this orientation to the next machine or work station by the cooperation of the alignment edge 15a of alignment rail 15 and guide rail 3 on the opposite side of the puck.

The provision of each puck tooth with a different elevation and the orientation rollers each having a corresponding orientation eliminate unnecessary rotation of the puck in order to achieve its desired direction of travel. This arrangement minimizes jamming or over rotation of the puck. While excellent results have been achieved with the embodiments of FIGS. 1 and 2 at conveyor speeds of from about 100 to about 125 feet per minute without puck jamming or misalignment, the embodiment of FIGS. 3 and 4 offer greater speed potential.

Yet another embodiment of the present invention is illustrated in FIGS. 5, 6 and 7, wherein like parts have been given like index numerals, once again, the product and the product support have been eliminated from the puck for purposes of clarity. This embodiment, employing air jets, can be used in instances where product geometry and weight permit.

In this embodiment, a conveyor 17 is shown, traveling in the direction of arrow A. To one side of conveyor 17 there is an alignment rail 18. To the other side of the conveyor, means (not shown) are located to provide air jets, indicated by arrows C. It will be noted that the air jets C extend transversely of conveyor 17 and perpendicular to and toward alignment rail 18.

A puck is shown at 19. The puck has a bottom surface 20 resting upon conveyor 17 and a circular peripheral surface 21. A slot 22 is formed in the circular side 21 of puck 19, and extends horizontally into the puck. The slot 22 terminates in a vertical surface 23 constituting a cord of the puck. The surface 23 serves as the puck slide surface. In the operation of this embodiment, the puck 19 will be received by conveyor 17 from a random surge such as an accumulating conveyor, the puck having a random orientation. The desired orientation of the puck is indicated by arrow D which is parallel to the puck slide surface 23. As the puck passes through air jets C, it will be urged against alignment rail 18 when the force of the air jets is greater than the friction between the puck bottom surface 20 and conveyor 17. This, in combination with movement of conveyor 17, will result in clockwise rotation of the puck (as viewed in FIG. 5). The puck 19 will continue to rotate until its slide surface 23 in slot 22 is engaged by the alignment edge 18a of alignment rail 18. This is shown in FIG. 7 and in broken lines in FIG. 5. When the slide surface 23 of the puck is engaged by the alignment rail edge 18a, the puck will be properly oriented with arrow D parallel to arrow A. To maintain the puck 19 properly oriented until it reaches the next work station or machine, a guide rail 24 may be provided, the puck traveling between alignment rail 18 and guide rail 24.

In the embodiment of FIGS. 5, 6 and 7, the friction between puck 19 and alignment rail edge 18a must produce a rotational force large enough to overcome the friction between puck bottom surface 20 and conveyor 17 to prevent the puck from sliding along alignment rail edge 18a. It would be within the scope of the invention to provide cooperating teeth on the alignment rail edge 18a and the circular side 21 of the puck, in a manner similar to that shown in the embodiment of FIGS. 8 and 9, next to be described.

FIGS. 8 and 9 semi-diagrammatically illustrate a preferred embodiment of the present invention. Briefly, this embodiment utilizes a toothed orientation rail, angled with respect to the conveyor direction, to engage teeth on a puck and initiate rotation thereof until the orientation rail is engaged by a flat (the slide surface) on the puck, thereby reorienting the puck to a preferred orientation after random surging and single-lining. The embodiment of FIGS. 8 and 9 is characterized by gentleness of handling of the puck (i.e. minimum puck acceleration and impact to achieve orientation), combined with positive orienting by virtue of the orientation rail and puck teeth. This embodiment is capable of high conveyor speeds without jams, reorienting 400 or more 4-inch diameter pucks per minute, for example.

FIGS. 8 and 9 illustrate a conveyor 25 travelling in the direction of arrow A. Again, conveyor 25 will lead from a random surge such as an accummulating conveyor and conventional means for single-lining the pucks. The entrance end of conveyor 25 is provided with a pair of guide rails 26 and 27. Guide rail 26 terminates in an alignment rail, generally indicated at 28. The alignment rail has a first portion 28a which extends part way across conveyor 25 at an acute angle thereto. The alignment rail portion 28a leads to a transition portion 28b which is gently curved (the curve being exaggerated in FIG. 8). The portion 28b (in turn) terminates in a portion 28c which extends parallel to the direction of movement of conveyor 25.

Alignment rail portion 28a is provided at its alignment edge with a plurality of gear teeth 29 in the manner of a rack. The length of the toothed portion 28a of alignment rail 28 must be equivalent to at least one circumference of the puck and preferably from about 1.5 to about 2 times the puck circumference. The portion 28b has a gently curved alignment edge as at 30, and the alignment rail portion 28c has an alignment edge, extending parallel to the direction of motion of conveyor 25, as at 31.

A puck is illustrated in FIGS. 8 and 9 at 32. The puck 32 has a bottom surface 33 in contact with conveyor 25. The puck 32 also has a circular exterior surface 34. The portion of puck 32 providing circular exterior surface 34 is surmounted by a D-shaped portion 35. The flat surface 36 of the D-shaped portion constitutes the puck slide surface The curved peripheral part of the D-shaped portion 35 is provided with a plurality of gear teeth 37 after the manner of a pinion. The teeth 37 are slightly inset from the circular surface 34 so that, in the random surge area, there can be puck-to-puck contact with only puck surfaces 34 in abuttment. Again, in FIGS. 8 and 9, the product and the product mount on the puck have been deleted for purposes of clarity.

The operation of the embodiment of FIGS. 8 and 9 can be described as follows. As a puck enters conveyor 25 between guide rails 26 and 27, it will have a random orientation. The desired orientation is indicated by arrow E. It will be noted that arrow E is parallel to slide surface 36. Further advance of puck 32 will cause it to engage the teeth 29 of alignment rail portion 28a. If, by happenstance, slide surface 36 is parallel to the toothed surface of alignment rail portion 28a, the puck will simply slide along this portion of the alignment rail, along alignment edge 30, and alignment rail edge portion 31 wherein it will be properly aligned with the desired orientation, arrow E being parallel to the conveyor direction indicated by arrow A. The aligned puck will remain aligned by cooperation of the alignment edge 31 of alignment rail portion 28c and guide rail 27, operating on opposite sides of the puck. The puck 32 is shown in broken lines at 32a with its sliding surface 36 sliding along teeth 29 near the end of alignment rail portion 28a. Puck 32 is shown fully aligned, and sliding along alignment rail edge 31 in broken lines at 32b.

On the other hand, should the puck approach the portion 28a of alignment rail 28 with a random orientation such as is shown in FIG. 8, its teeth 37 will mesh with the teeth 29 of alignment rail portion 28a and continued urging of the puck by conveyor 25 will cause the puck to rotate along the teeth 29 of alignment rail portion 28a in a counterclockwise direction, until the slide surface 36 of the puck engages the teeth 29, as shown in broken lines at 32a. At this point, the puck will travel about alignment edge 30 of alignment rail portion 28b to alignment rail edge 31 of alignment rail portion 28c and onto the next work station or machine.

FIGS. 10 and 11 illustrate a preferred form of the puck 32, complete with product and product support. Again, like parts have been given like index numerals. The puck 32 of FIGS. 10 and 11 comprises a molded disk-like element 38, having an integral annular flange 39 providing the circular exterior surface 34 of the puck. The D-shaped portion 35 of the puck constitutes an integral, one-piece part of molding 38. The plastic material from which molding 38 is made can be of any suitable type such as ABS plastic. The portion 35 provides slide surface 36 and teeth 37. It will be noted in the embodiment of FIGS. 10 and 11 that, unlike the puck 32 of FIGS. 8 and 9, the slide surface 36 is located at the diameter of the puck. The ends of slide surface 36 terminate in curved surfaces, one of which is shown at 40 in FIGS. 10 and 11. The curved surfaces 40 make the transition between slide surface 36 and teeth 37.

To its underside, the molded member 38 has a metallic disk 41 affixed thereto. The metallic disk 41 adds weight to the puck and provides the puck bottom surface 33 which contacts conveyor 25. Metallic disk 41 can be affixed to molded member 38 by any appropriate means (not shown) and including adhesive means, fastener means, or the like. The diameter of the disc 41 can be smaller than that of the molded member 50. On the exemplary embodiment of FIGS. 10 and 11, the diameter of metallic disc 41 is shown to be smaller than that of molded member 50 by about one fourth.

The puck conveyor-contacting surface 33 must provide stand-alone stability on the conveyor. All of the puck embodiments taught herein are illustrated and described as having a simple, flat, circular conveyor-contacting surface at their bottom ends. It will be understood that the puck conveyor-contacting surface must be flat, but it may have any appropriate symmetrical peripheral configuration (such as circular, annular, polygonal, and the like). The conveyor-contacting surface could be made up of a plurality of separate coplanar surfaces. For example, a flat circular conveyor-contacting surface could comprise a plurality of coplanar, evenly spaced pie-shaped surfaces, or an annular conveyor-contacting surface could comprise a plurality of coplanar, evenly spaced arcuate surfaces. Nevertheless, the effective center of the conveyor-contacting surface should be substantially centered with respect to the circular periphery of the puck. Furthermore, the center of gravity of the product-puck combination should be substantially centered with respect to the conveyor-contacting surface. Under these circumstances, the product-puck combination will rotate at a uniform rate so as not to interfere with the orienting of adjacent pucks. As used herein and in the claims, phrases such as "flat conveyor-contacting bottom surface' should be sufficiently broadly interpreted as to include variations of the type just described.

For purposes of exemplary showing, a product in the form of a bottle 42 is illustrated in FIGS. 10 and 11. An exemplary mount for bottle 42 is generally indicated at 43. The mount comprises a base 44 and four upstanding members 45, 46, 47 and 48. The upstanding members 45 through 48 are so spaced with respect to each other and are of such a height that bottle 42 will be securely held on base 44, and yet can be easily placed in and easily removed from the support 43. The base 44 of support 43 is secured to the upper surface of puck portion 35. As is most clearly seen in FIG. 11, the base 44 overhangs the portion 35. Furthermore, the base 44 extends beyond upstanding members 45 and 47 by a distance slightly greater than it extends beyond upstanding members 46 and 48. This assures that the center of gravity of the puck 32 and product 42 lies at about the center of the assembly and as low as possible with respect to the assembly.

The configuration of the puck of FIGS. 10 and 11 and the low and centered position of the center of gravity of the puck and product assure that the puck will not topple while being conveyed, transferred over a dead plate, or upon impact of other pucks on an accumulating conveyor.

It is to be noted that the product 42 is nested totally within the puck parameters. Therefore, when puck-to-puck contact occurs on an accumulating conveyor or the like, adjacent pucks will abut each other only at their circular peripheral surfaces 34, thus protecting the product. Furthermore, adjacent pucks cannot interlock in any way. The circular peripheral surface 34 is of a sufficient width that adjacent pucks cannot shingle or "squirt" upward due to pressure from adjacent pucks.

To assure desired puck behavior in random surge on an accumulating conveyor or the like, it is desired that the circular peripheral surface 34 be rigid, have a relatively low coefficient of friction and be perpendicular to the bottom surface 33 of the puck and to the conveyor. As indicated above, the width of circular peripheral surface 34 should be such as to preclude shingling and surface 34 should extend beyond all other parts of the puck and the product.

The puck 32 impacts the alignment rail portion 28a (FIG. 8) either on its sliding surface 36 or on its teeth 37. These two surfaces are at the same level and, while illustrated as being above the circular exterior surface 34, they could be located therebelow. The rolling velocity of puck 32 along alignment rail portion 28a is determined primarily by the angle of the alignment rail portion 28a to the conveyor 25, and the ratio of the diameter of puck metallic disk member 41 to its rolling diameter 37. Higher puck rolling velocities can be achieved by making the angle of alignment rail portion 28a to the conveyor 25 smaller, or by decreasing the diameter of puck metallic disc member 41 relative to the diameter of toothed surface 37.

The teeth 37 of the puck and the teeth 29 of alignment rail portion 28a guarantee positive rotation of the puck. In order for these teeth to engage as soon as possible, it is desirable to use a narrow tooth land, combined with a wide tooth root. To achieve uniform rolling characteristics of the puck 32 along alignment rail portion 28a, it is important that center of gravity of the puck and product combination be as nearly at the center of the puck as possible.

When the slide surface 36 of the puck 32 contacts the toothed alignment edge 29 of alignment rail portion 28a, there is a transition between puck rotation and puck sliding. The rounded corners (one of which is shown at 40) of the portion 35 of the puck tend to assure that some slight overtumble or misalignment of puck slide surface 36 and the toothed edge 29 of alignment rail portion 28a does not cause the puck teeth 37 to reengage the rail teeth 29.

For ideal behavior of puck 32 as it rotates and then slides along the portion 28a of alignment rail 28, it is desirable to always have a high puck to conveyor coefficient of friction, a low puck to rail coefficient of sliding friction, a low center of gravity of puck and product, a relatively heavy puck and as large a slide surface 36 on the puck as possible. The ratio of the diameter of the toothed surface 37 of the puck and the metallic base portion 41 of the puck should be kept as small as possible, while maintaining stability of the puck against toppling.

Finally, the angle of the alignment rail portion 28a to the conveyor should be selected for best operation. Stability against overtumble of the puck in transition from rolling to sliding along alignment rail portion 28a is enhanced by a large angle of the alignment rail portion 28a with respect to the conveyor. On the other hand, thruput is increased by a smaller angle. For most operations, an optimum rail angle appears to be between about 30° and about 45°.

FIG. 12 is a plan view of a conveyor assembly of the embodiment of FIGS. 8 and 9 utilizing pucks of the type shown in FIGS. 10 and 11. Again, the product 42 and product support 43 have been deleted from each puck for purposes of clarity. In FIG. 12, those parts equivalent to the parts illustrated in FIG. 8 have been given like index numerals. To this end, the conveyor is indicated at 25 having a direction of travel indicated by arrow A. Guide rails 26 and 27 are shown together with alignment rail 28, having portions 28a, 28b and 28c. FIG. 12 also illustrates the single-lining portion of conveyor 25, generally indicated at 49 and having a guide rail 50 which converges with guide rail 26 causing the pucks 32 to achieve single-lining.

It has been determined that, particularly at high speeds of conveyor 25, the pucks 32 have a tendency not to rotate when they meet the portion 28a of alignment rail 28. The puck teeth tend to slide over the teeth 29 of alignment rail portion 28a, and the pucks tend to bounce upon impact with alignment rail portion 28a. Thus, the positive rotation of the pucks can be erratic.

There are a number of expedients which can be employed to coax the teeth of the puck into mesh with the teeth 29 of alignment rail portion 28a and to initiate positive rotation of the pucks. One such expedient is to provide the alignment rail 28 with a gently curved lead-in portion 28d, the radius of curvature of the portion 28d being at least twice the puck diameter to minimize impact. Furthermore, every other tooth of the initial part of lead-in portion 28d may be eliminated, as is generally indicated at 51.

Yet another expedient is to mount a resilient plate 52 at the end of guide rail 50. In order for a puck 32 to pass between the initial part of lead-in portion 28d of alignment rail 28 and the resilient spring plate 52, it is necessary that the spring plate be slightly bent by the puck. Thus, the spring plate 52 urges the adjacent puck against the initial part of lead-in portion 28d of alignment rail 28.

Yet another expedient is to provide a member 53, along guide rail 26. The member 53 is provided with teeth 54 similar to teeth 29 of alignment rail portion 28a. The member 53 will begin to initiate rotation of at least those pucks which contact it. It will rotate those pucks to an orientation such that when the teeth 54 no longer engage the puck teeth, the puck slide surface is nearly aligned with the rail portion 28d.

Another method is to cause every puck to begin rotating just prior to entering the lead-in portion 28d of alignment rail 28. This is accomplished by a driven friction wheel having a vertical axis. Such a driven friction wheel is illustrated in broken lines at 55, located at the end of guide rail 50. The periphery of friction wheel 55 contacts the circular peripheral surface 34 of each puck just before it reaches the tooth portion of the alignment rail lead-in portion 28d. This would permit elimination of the member 53 in FIG. 12. As viewed in FIG. 12, friction wheel 55 will rotate in a clockwise direction to impart the proper counter-clockwise rotation to each of the entering pucks 32. The friction wheel 55 should spin with a tangential speed faster than that of conveyor 25 whereby to cause the puck to rotate when it is pinched between friction wheel 55 and the initial part of the alignment rail lead-in portion 28d. To this end, wheel 55 is preferably provided with a resilient, high-friction tire. With the use of friction wheel 55, every puck 32 is caused to rotate, even those already prealigned by member 53. The rotation imparted to each of the pucks 32 would be close to the rotational speed of the puck along alignment rail portion 28a when the puck and rail teeth are properly meshed.

Figure 13:
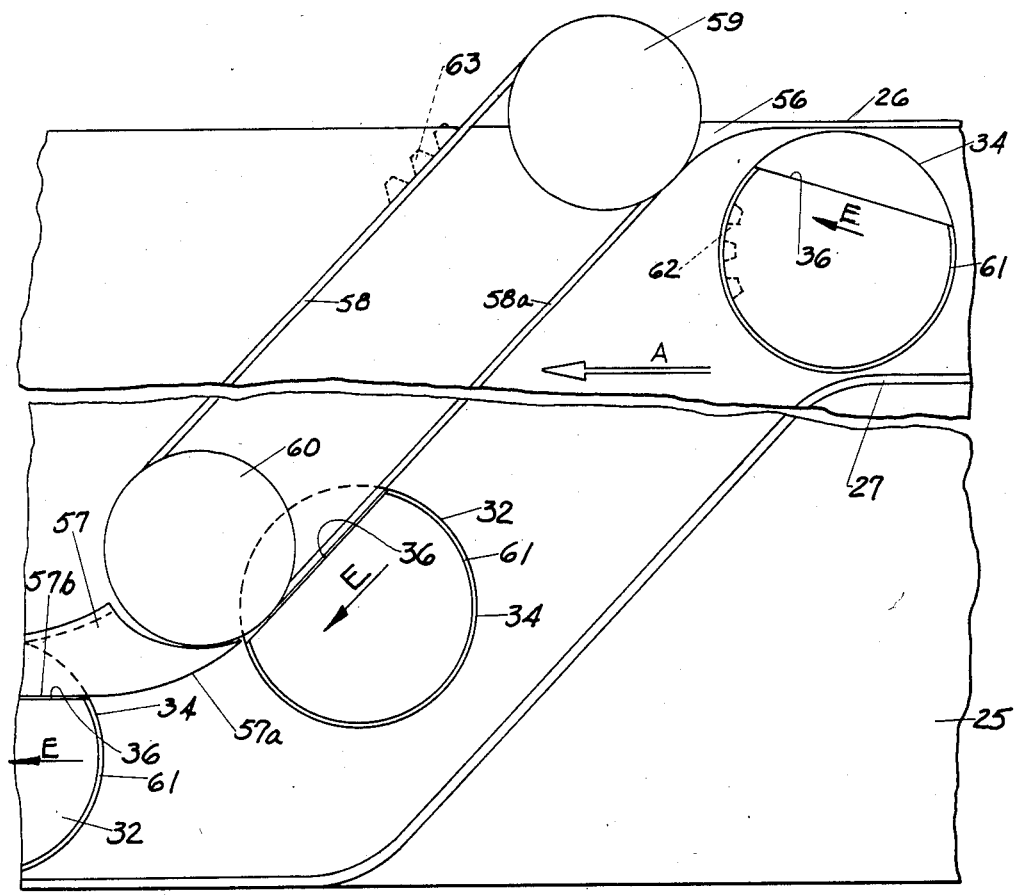
FIG. 13 is a fragmentary, semi-diagrammatic plan view similar to FIG. 8 and illustrating a modification of the embodiment of FIGS. 8, 9 and 12.

FIG. 13 is a fragmentary plan view similar to FIG. 8 and showing a modification of the embodiment of FIGS. 8, 9 and 12. Again, like parts have been given like index numerals. To this end, conveyor 25 is shown traveling in the direction of arrow A. The conveyor 25 leads from a random surge such as an accumulating conveyor and conventional means for single-lining the pucks. The entrance end of the conveyor 25 is provided with guide rails 26 and 27. In this instance, guide rail 26 terminates in a lead-in portion 56, similar to lead-in portion 28d (FIG. 12). It will be understood by one skilled in the art that the curvature of lead-in portion 56 is greatly exaggerated in this semi-diagrammatic representation. Another guide rail 57 is provided having a gently curved alignment edge portion 57a (again exaggerated in FIG. 13) equivalent to the alignment edge portion 30 of FIG. 8 and an alignment edge portion parallel to the direction of motion of the conveyor, as at 57b. The alignment edge portion 57b of alignment rail 57 is equivalent to alignment edge portion 31 of alignment rail portion 28a of FIG. 8.

In the embodiment of FIG. 13, the toothed alignment rail portion 28a of FIG. 8 has been replaced by an endless belt 58 passing about pulleys 59 and 60. At least one of pulleys 59 and 60 is provided with powered means (not shown) causing it to rotate. The other of the pulleys can be an idler pulley, if desired. The flight 58a of endless belt 58 is so arranged as to be contactable by the slide surface 36 of each puck 32 and that peripheral surface 61 of each puck which extends from one end of slide surface 36, about the puck, to the other end of slide surface 36. Frictional engagement between the flight 58a and the surface 61 of each puck 34 will cause each puck to rotate until its slide surface 36 abuts the flight 58a. Thereafter, the slide surface will travel along the remainder of flight 58a and along edge portions 57a and 57b of rail 57 to their next destination. The frictional engagement between the surface 61 and the flight 58a of belt 58 must be sufficient to overcome the friction between the bottom surface of the puck and the conveyor 25, so that the pucks will indeed be rotated by belt flight 58a. Alternatively, the surface 61 of the pucks 34 may have teeth formed therein, equivalent to teeth 37 of FIG. 8. Such teeth are fragmentarily shown in broken lines in FIG. 13 at 62. Similarly, the continuous belt 58 may have teeth thereon, equivalent teeth 29 of FIG. 8. Such teeth are fragmentarily shown in broken lines at 63 in FIG. 13.

It will be understood by one skilled in the art that the endless belt 58 may be driven in either direction. If pulleys 59 and 60 rotate in a counter-clockwise direction (as viewed in FIG. 13), the pucks 34 will tend to turn faster and alignment can be accomplished in a lesser distance. The opposite, of course, is true if pulleys 59 and 60 are rotated in a clockwise direction (as viewed in FIG. 13). In the latter instance, however, the pucks will be subjected to less acceleration which, under some circumstances, would be desirable, as for example when dealing with a fragile or spillable product.

In all of the puck embodiments herein shown and described, the slide surfaces (for example slide surface 36 of FIGS. 10 and 11) have been vertical surfaces and in most instances vertical planar surfaces extending parallel to the desired direction of travel when the pucks are properly oriented. It is necessary that the slide surface of the puck be straight, or the equivalent (note the two slide surfaces described with respect to FIG. 1). However, it is not necessary that the slide surface be either vertical or planar. The slide surface could be angled to the vertical if the alignment edge of the alignment rail is correspondingly angled. The alignment rail could, in fact, be of circular cross section under which circumstances the slide surface could be correspondingly arcuate from top to bottom. In similar fashion, the rotation producing surface of the puck need not be vertical, but could be angled to the vertical or arcuate from top to bottom.

As indicated above, the present invention enables the use of network style lines in those lines wherein specific orientation of the product is required at selected stations only. FIG. 14 is a diagrammatic representation of such a network style line. The first station of the line comprises three low speed bottle unscramblers 64, 65 and 66, arranged in parallel and operating at the rate of about 200 bottles per minute (BPM). An unscrambler, well known in the art, takes bottles from a bin thereof and uprights and single-lines them. The next station comprises three low speed puck loaders 67, 68 and 69, again operating at a speed of about 200 BPM. Bottles are fed to each of the loaders 67, 68 and 69 by unscramblers 64, 65 and 66, respectively. Each of the loaders 67, 68 and 69 are also fed properly oriented pucks, as will be described hereinafter. If a particular orientation between the bottles and the pucks is required in order to deal with handled bottles or the like, it is achieved at this stage, just before the bottles and pucks are brought together.

The next station comprises an accumulating conveyor 70. The conveyor 70 receives empty bottles on pucks from each of the loaders 67, 68 and 69. The accumulating conveyor 70 provides a random surge of the empty bottles on pucks.

From accumulating conveyor 70, the bottles pass through a pair of single-lining stations 71 and 72, operating in parallel at a rate of about 300 BPM. Each of the single-lining stations 71 and 72 feeds randomly oriented empty bottles on pucks to a cleaning, filling and capping station. Two such stations in parallel are indicated at 73 and 74. From stations 73 and 74, the cleaned, filled and capped bottles on pucks pass to an accumulating conveyor 75, again creating a random surge of the bottle-puck assemblies.

From the random surge thereof on accumulating conveyor 75, some of the bottle-puck assemblies are led to a high speed single-lining and orienting station 76, capable of operating at speeds of about 600 BPM. From station 76, the bottle-puck assemblies advance to a high speed labeling station 77, again capable of operating at a rate of about 600 BPM.

From accumulating conveyor 75, others of the bottle-puck assemblies pass through single-lining and orienting station 78. Station 78 is in parallel with station 76, and operates at a lower speed of about 300 BPM. Station 78 prepares the bottle-puck assemblies for labeling station 79. Station 79 comprises a redundant labeler in parallel with station 77 and operating at a lower speed of about 300 BPM. Both labeling stations 77 and 79 discharge their bottle-puck assemblies on accumulating conveyor 80, creating thereon a random surge of labeled bottles on pucks.

From accumulating conveyor 80, the bottle-puck assemblies pass through a high speed, single-lining and orienting station 81, operating at a rate of about 600 BPM. The single-lined and oriented bottle-puck assemblies pass from station 81 to high speed puck-unloader/-case packer station 82, again operating at a speed of about 600 BPM. In the exemplary embodiment, the filled, capped and labeled bottles are removed at station 82 from their pucks and are packed in cases (at 24 bottles per case), at a rate of 25 cases per minute. These cases are conveyed to a sealer (not shown) and thereafter to inventory.

Meanwhile, the emptied pucks from station 82 are collected on accumulating conveyor 83, creating a random surge of empty pucks. Accumulating conveyor 83, in turn, feeds three single-lining and orienting stations 84, 85 and 86, located in parallel and operating at a rate of about 200 BPM. As is clearly shown in FIG. 14, station 84 provides oriented pucks for low speed puck loading station 67, while stations 85 and 86 provide oriented pucks for low speed puck loading stations 68 and 69, respectively.

It will be evident from the above description of FIG. 14 that the orienting means and method of the present invention are practiced at stations 76, 78, 81, 84, 85 and 86. It will be noted from FIG. 14 that specific orientation of the bottle-puck assemblies is achieved and maintained only as needed. The bottle-puck assemblies flow from a random accumulation thereof through any of the machines or stations which are operating, and at a rate demanded by that particular machine or station. Large, space efficient, accumulation of bottle-puck assemblies between operations enable the line to run even when individual machines or stations are down. The various machines in the line are independent of the speed of other machines in the same line and of other machines in the same operation. Due to the redundancy of the stations, the line can be kept running even though some of the stations are down for repair, size changeover, or the like.

In most instances, in the practice of the present invention, it would be necessary to custom design the product support for each particular product. This would allow bottle and packaging designers additional freedom in providing more appealing and functional containers.

Figure 15:
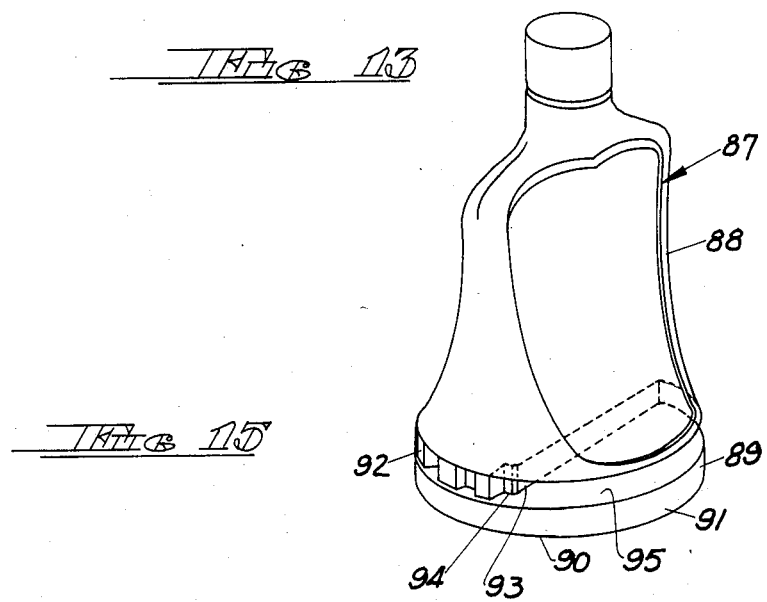
FIG. 15 is a perspective view of an integral bottle-puck structure.

It would even be within the scope of the invention to design a puck in such a way that it constitutes a permanent, integral part of the product package. An example of such a structure is illustrated in FIG. 15. The structure is generally indicated at 87 and comprises a bottle portion 88 and a puck portion 89. The puck portion 89 has a flat bottom surface 90 equivalent to bottom surface 33 of FIG. 11. The puck portion 89 also has a circular peripheral surface 91 equivalent to surface 34 of FIG. 11. Finally, puck portion 89 has a toothed rotation imparting surface 92, a slide surface 93 and curved transition surfaces therebetween (one of which is shown at 94) equivalent to teeth 37, slide surface 36 and transition surfaces 40 of FIG. 11. The slide surface 93 constitutes the base of a horizontal notch 95 formed in the structure. Again, the circular peripheral surface 91 comprises the outermost part of the structure intended to contact similar surfaces of similar structures in a random surge thereof (as on an accumulating conveyor). The structure functions in substantially the same manner as the bottle-puck assembly of FIGS. 10 and 11.

Modifications may be made in the invention without departing from the spirit of it.

What is claimed is:

1. Means for specifically orienting and conveying products in a desired common direction of travel, said means comprising a puck for each product and a horizontal moving conveyor, each puck having a flat conveyor-contacting bottom surface and a circular peripheral surface contactable by corresponding circular peripheral surfaces of other pucks when said pucks are located in a random surge thereof, each puck being surmounted by a product support on which one of said products is mounted, between said bottom surface and said product support each puck having a rectilinear slide surface extending substantially parallel to said desired direction of travel of said puck when said puck is properly oriented, and a rotation-producing surface, said rotation-producing surface comprising an arcuate surface extending about said puck and being coextensive with and connecting the ends of said slide surface, said circular peripheral surface extending radially beyond said slide and rotation-producing surfaces, said product support, and said product, a rail having an edge contactable by said slide and said rotation-producing surfaces of said pucks, said rail having first and second portions, said first rail portion edge being adapted to contact said rotation-producing surface of said pucks, said first rail portion overlying and extending partway across said conveyor with its edge lying at an acute angle to the direction of travel of said conveyor, said first rail portion having a gently curved lead-out part leading to said second rail portion overlying said conveyor, said edge of said first rail portion being configured to cooperate with said rotation-producing surfaces of said pucks to rotate said pucks until said edge of said first rail portion is engaged by said slide surfaces of said pucks, said edge of said second portion of said rail being substantially parallel to said direction of travel of said conveyor and being configured to engage said slide surfaces of said pucks to maintain the desired orientation thereof and the products thereon, and means to maintain said contact of said second rail portion edge and said slide surface of each puck when said pucks are properly aligned and traveling in said desired direction.

2. The structure claimed in claim 1 wherein said means to maintain contact of said second rail portion edge and said slide surface of each puck comprises a guide rail extending parallel to said second rail portion edge and in said desired direction of travel, said guide rail being spaced from said second rail portion edge by a distance slightly greater than the maximum distance between said slide surface and said circular peripheral surface of each puck as measured along a diameter of said puck perpendicular to said slide surface.

3. The structure claimed in claim 1 wherein said edge of said first portion of said rail and said rotation-producing surfaces of said pucks are provided with cooperating teeth.

4. The structure claimed in claim 3 wherein said first rail portion lies at an angle of from about 30° to about 45° to the direction of travel of said conveyor.

5. The structure claimed in claim 3 wherein said first rail portion is of a length at least equal to the circumference of said pucks.

6. The structure claimed in claim 3 wherein said first rail portion is of a length of from about 1.5 to about 2 times the circumference of said pucks.

7. The structure claimed in claim 3 including means to assist the proper meshing of the puck rotation-producing surface teeth with said teeth of said first portion of said rail.

8. A network style product line of the type having a series of operations to be performed on each product passing therethrough, selected operations at least having redundant stations performing the same operation, each operation being preceded by an accumulating conveyor having a random surge of said products thereon, each accumulating conveyor feeding products to single-lining stations equal in number to the number of stations of the next operation, selected ones of at least of said operation stations requiring specific orientation of said products passing therethrough, means are provided for each of said last mentioned operation stations requiring specific product orientation for specifically orienting and conveying products in a desired direction of travel to that station from its respective single-lining station, each of said means comprising a horizontal moving conveyor and a puck for each product on which each product is mounted at the beginning of said line, each puck having a flat conveyor-contacting bottom surface and a circular peripheral surface contactable by corresponding circular peripheral surfaces of other pucks when said pucks are located in a random surface thereof, each puck being surmounted by a product support on which one of said products is mounted, between said bottom surface and said product support each puck having a rectilinear slide surface extending substantially parallel to said desired direction of travel of said puck when said puck is properly oriented, and a rotation-producing surface, said rotation-producing surface comprising an arcuate surface extending about said puck and being coextensive with and connecting the ends of said slide surface, said circular peripheral surface extending radially beyond said slide and rotation-producing surfaces, said product support, and said product, a rail having an edge contactable by said slide and said rotation-producing surfaces of said pucks, said rail having first and second portions, said first rail portion edge being adapted to contact said rotation-producing surface of said pucks, said first rail portion overlying and extending partway across said conveyor with its edge lying at an acute angle to the direction of travel of said conveyor, said first rail portion having a gently curved lead-out part leading to said second rail portion overlying said conveyor, said edge of said first rail portion being configured to cooperate with said rotation-producing surfaces of said pucks to rotate said pucks until said edge of said first rail portion is engaged by said slide surfaces of said pucks, said edge of said second portion of said rail being substantially parallel to said direction of travel of said conveyor and being configured to engage said slide surfaces of said pucks to maintain the desired orientation thereof and the products thereon, and means to maintain said contact of said second rail portion edge and said slide surface of each puck when said pucks are properly aligned and traveling in said desired direction.

9. Means for specifically orienting and conveying products in a desired common direction of travel, said means comprising a puck for each product and a horizontal moving conveyor, each puck having a flat conveyor-contacting bottom surface and a circular peripheral surface contactable by corresponding circular peripheral surfaces of other pucks when said pucks are located in a random surge thereof, each puck being surmounted by a product support on which one of said products is mounted, between said bottom surface and said product support each puck having a rectilinear slide surface extending substantially parallel to said desired direction of travel of said puck when said puck is properly oriented, and a rotation-producing surface, said rotation-producing surface comprising an arcuate toothed surface extending about said puck and being coextensive with and connecting the ends of said slide surface, said circular peripheral surface extending radially beyond said slide and rotation-producing surfaces, said product support, and said product, a rail having an edge contactable by said slide and said rotation-producing surfaces of said pucks, said rail having first and second portions, said first rail portion overlying and extending partway across said conveyor with its edge lying at an acute angle to the direction of travel of said conveyor, said first rail portion having a gently curved lead-in part and a gently curved lead-out part leading to said second rail portion overlying said conveyor, said edge of said first rail portion being toothed, said rail teeth being configured to cooperate with said toothed rotation-producing surfaces of said pucks until said edge of said first rail portion is engaged by said slide surfaces of said pucks, said edge of said second portion of said rail being substantially parallel to said direction of travel of said conveyor and being configured to engage said slide surfaces of said pucks to maintain the desired orientation thereof and the products thereon, means to maintain said contact of said second rail portion edge and said slide surface of each puck when said pucks are properly aligned and traveling in said desired direction, and means to assist meshing of said puck teeth with said teeth of said first portion of said rail comprising said lead-in part of said first portion of said rail having a radius of curvature at least twice the diameter of said pucks, said lead-in part having a reduced number of equally spaced teeth thereon.

10. Means for specifically orienting and conveying products in a desired common direction of travel, said means comprising a puck for each product and a horizontal moving conveyor, each puck having a flat conveyor-contacting bottom surface and a circular peripheral surface contactable by corresponding circular peripheral surfaces of other pucks when said pucks are located in a random surge thereof, each puck being surmounted by a product support on which one of said products is mounted, between said bottom surface and said product support each puck having a rectilinear slide surface extending substantially parallel to said desired direction of travel of said puck when said puck is properly oriented, and a rotation-producing surface, said rotation-producing surface comprising an arcuate toothed surface extending about said puck and being coextensive with and connecting the ends of said slide surface, said circular peripheral surface extending radially beyond said slide and rotation-producing surfaces, said product support, and said product, a rail having an edge contactable by said slide and said rotation-producing surfaces of said pucks, said rail having first and second portions, said first rail portion overlying and extending partway across said conveyor with its edge lying at an acute angle to the direction of travel of said conveyor, said first rail portion having a gently curved lead-in part and a gently curved lead-out part leading to said second rail portion overlying said conveyor, said edge of said first rail portion being toothed, said rail teeth being configured to cooperate with said toothed rotation-producing surfaces of said pucks until said edge of said first rail portion is engaged by said slide surfaces of said pucks, said edge of said second portion of said rail being substantially parallel to said direction of travel of said conveyor and being configured to engage said slide surfaces of said pucks to maintain the desired orientation thereof and the products thereon, means to maintain said contact of said second rail portion edge and said slide surface of each puck when said pucks are properly aligned and traveling in said desired direction, and means to assist meshing of said puck teeth with said teeth of said first portion of said rail comprising a resilient plate, a portion of said plate being spaced from said lead-in part of said first portion by a distance less than the diameter of said pucks whereby when said pucks pass between said lead-in part and said resilient plate, said plate urges said pucks against said lead-in part of first rail portion.

11. Means for specifically orienting and conveying products in a desired common direction of travel, said means comprising a puck for each product and a horizontal moving conveyor, each puck having a flat conveyor-contacting bottom surface and a circular peripheral surface contactable by corresponding circular peripheral surfaces of other pucks when said pucks are located in a random surge thereof, each puck being surmounted by a product support on which one of said products is mounted, between said bottom surface and said product support each puck having a rectilinear slide surface extending substantially parallel to said desired direction of travel of said puck when said puck is properly oriented, and a rotation-producing surface, said rotation-producing surface comprising an arcuate toothed surface extending about said puck and being coextensive with and connecting the ends of said slide surface, said circular peripheral surface extending radially beyond said slide and rotation-producing surfaces, said product support, and said product, a rail having an edge contactable by said slide and said rotation-producing surfaces of said pucks, said rail having first and second portions, said first rail portion overlying and extending partway across said conveyor with its edge lying at an acute angle to the direction of travel of said conveyor, said first rail portion having a gently curved lead-in part and a gently curved lead-out part leading to said second rail portion overlying said conveyor, said edge of said first rail portion being toothed, said rail teeth being configured to cooperate with said toothed rotation-producing surfaces of said pucks until said edge of said first rail portion is engaged by said slide surfaces of said pucks, said edge of said second portion of said rail being substantially parallel to said direction of travel of said conveyor and being configured to engage said slide surfaces of said pucks to maintain the desired orientation thereof and the products thereon, means to maintain said contact of said second rail portion edge and said slide surface of each puck when said pucks are properly aligned and traveling in said desired direction, and means to assist meshing of said puck teeth with said teeth of said first portion of said rail comprising a rectilinear toothed element ahead of said lead-in part of said first rail portion intiating rotation of some at least of said pucks prior to contact with said lead-in part.

12. Means for specifically orienting and conveying products in a desired common direction of travel, said means comprising a puck for each product and a horizontal moving conveyor, each puck having a flat conveyor-contacting bottom surface and a circular peripheral surface contactable by corresponding circular peripheral surfaces of other pucks when said pucks are located in a random surge thereof, each puck being surmounted by a product support on which one of said products is mounted, between said bottom surface and said product support each puck having a rectilinear slide surface extending substantially parallel to said desired direction of travel of said puck when said puck is properly oriented, and a rotation-producing surface, said rotation-producing surface comprising an arcuate toothed surface extending about said puck and being coextensive with and connecting the ends of said slide surface, said circular peripheral surface extending radially beyond said slide and rotation-producing surfaces, said product support, and said product, a rail having an edge contactable by said slide and said rotation-producing surfaces of said pucks, said rail having first and second portions, said first rail portion overlying and extending partway across said conveyor with its edge lying at an acute angle to the direction of travel of said conveyor, said first rail portion having a gently curved lead-in part and a gently curved lead-out part leading to said second rail portion overlying said conveyor, said edge of said first rail portion being toothed, said rail teeth being configured to cooperate with said toothed rotation-producing surfaces of said pucks until said edge of said first rail portion is engaged by said slide surfaces of said pucks, said edge of said second portion of said rail being substantially parallel to said direction of travel of said conveyor and being configured to engage said slide surfaces of said pucks to maintain the desired orientation thereof and the products thereon, means to maintain said contact of said second rail portion edge and said slide surface of each puck when said pucks are properly aligned and traveling in said desired direction, and means to assist meshing of said puck teeth with said teeth of said first portion of said rail comprising a driven friction wheel so placed as to contact and initiate rotation of each puck just prior to contact of said puck and said lead-in part of said first rail portion.

13. A process of specifically orienting and conveying products in a desired direction of travel, comprising the steps of providing a plurality of pucks each comprising a body having a flat conveyor-contacting bottom surface and a circular peripheral surface contactable by corresponding circular peripheral surfaces of other pucks when said pucks are located in a random surge thereof, each puck being surmounted by a product support, between said bottom surface and said product support each puck having a rectilinear slide surface extending substantially parallel to said desired direction of travel of said puck when said puck is properly oriented, and a rotation-producing surface comprising an arcuate surface extending about said puck and being coextensive with and connecting the ends of said slide surface, said circular peripheral surface extending radially beyond said slide and rotation-producing surfaces, said product support, and said product, mounting each product on a puck, conveying said pucks on a horizontal moving conveyor one after the other, providing a rail having an edge contactable by said slide and rotation-producing surfaces of said pucks, said rail having first and second portions, locating said first rail portion so as to overlie and extend partway across said conveyor with its edge portion lying at an acute angle to the direction of travel of said conveyor, providing said first rail portion with a gently curved lead-in part and a gently curved lead-out part leading to said second rail portion overlying said conveyor and extending substantially parallel to the direction of travel of said conveyor, advancing said pucks one by one against said first rail edge portion to rotate each of said pucks until said first rail portion edge is engaged by said puck slide surface, and continuing to advance said pucks with their slide surfaces engaging said edge of said second rail portion to maintain said desired puck and product orientation.

14. The process claimed in claim 13 including the steps of providing a guide rail extending parallel to said second rail portion edge and in said desired direction of travel, spacing said guide rail from said second rail portion edge by a distance slightly greater than the maximum distance between said slide surface and said circular peripheral surface of said puck, and advancing each puck between said second rail portion edge and said guide rail to maintain said second rail portion edge-slide surface contact for each puck.

15. The process claimed in claim 13 including the step of providing said initial portion of said rail edge and said rotation-producing surfaces of said pucks with cooperating teeth.

16. The process claimed in claim 13 wherein said first rail portion lies at an angle of from about 30° to about 45° to the direction of travel of said conveyor.

17. The process claimed in claim 13 including the step of urging said puck teeth into engagement with said teeth of said first portion of said rail.

18. The process claimed in claim 13 including the step of initiating rotation of some at least of said pucks prior to contact thereof with said first portion of said rail.

* * * * *

UNITED STATES PATENT AND TRADEMARK OFFICE
CERTIFICATE OF CORRECTION

PATENT NO. : 4,664,248

DATED : May 12, 1987

INVENTOR(S) : William H. Goodman, Jr., Alson R. Harm, Ronald W. Kock, Howard N. Reiboldt It is certified that error appears in the above-identified patent and that said Letters Patent is hereby corrected as shown below:

Column 2, line 13, "capabilty" should read -- capability --.

Column 10, line 50, "surface'" should read -- surface" --.

Column 17, line 22, delete "of", third occurrence.

Column 17, line 36, "surface" should read -- surge --.

Signed and Sealed this

Twentieth Day of October, 1987

Attest:

DONALD J. QUIGG

*Attesting Officer*         *Commissioner of Patents and Trademarks*